(12) United States Patent
Haun et al.

(10) Patent No.: US 7,976,180 B1
(45) Date of Patent: Jul. 12, 2011

(54) SOLAR POWERED RECHARGEABLE STREET LIGHT WITH TAMPER RESISTANT NETWORKABLE SYSTEM

(75) Inventors: Darrell N. Haun, Sugar Land, TX (US); Donald N. Haun, Stafford, TX (US)

(73) Assignee: Solarcraft, Inc., Stafford, TX (US)

( * ) Notice: Subject to any disclaimer, the term of this patent is extended or adjusted under 35 U.S.C. 154(b) by 60 days.

(21) Appl. No.: 12/624,188

(22) Filed: Nov. 23, 2009

(51) Int. Cl.
*F21L 4/08* (2006.01)

(52) U.S. Cl. ............... 362/183; 362/153.1; 362/192; 362/413; 362/431

(58) Field of Classification Search .......... 362/192, 362/183, 413, 431, 153.1, 153
See application file for complete search history.

(56) References Cited

U.S. PATENT DOCUMENTS

| | | | | | |
|---|---|---|---|---|---|
| 4,200,904 | A | * | 4/1980 | Doan | 362/183 |
| 4,281,369 | A | * | 7/1981 | Batte | 362/183 |
| 6,942,361 | B1 | * | 9/2005 | Kishimura et al. | 362/240 |
| 7,731,383 | B2 | * | 6/2010 | Myer | 362/145 |
| D622,887 | S | * | 8/2010 | Lewis | D26/71 |
| 2005/0068765 | A1 | * | 3/2005 | Ertze Encinas et al. | 362/183 |
| 2007/0107298 | A1 | * | 5/2007 | Miao et al. | 43/113 |
| 2007/0159836 | A1 | * | 7/2007 | Huang et al. | 362/431 |
| 2007/0287389 | A1 | * | 12/2007 | Pockat et al. | 455/73 |
| 2008/0137327 | A1 | * | 6/2008 | Hodulik | 362/183 |
| 2008/0298051 | A1 | * | 12/2008 | Chu | 362/183 |

* cited by examiner

*Primary Examiner* — Robert May
*Assistant Examiner* — Leah S Lovell
(74) *Attorney, Agent, or Firm* — Buskop Law Group, PC; Wendy Buskop

(57) ABSTRACT

A solar powered rechargeable street light, which can be networked to a system. The modular and tamper resistant street light and system can be used with individual street lights or a network of street lights. The system can be powered from a central controller, which can detect tampering by individuals or harsh weather conditions.

16 Claims, 9 Drawing Sheets

SOLAR POWERED RECHARGEABLE STREET LIGHT WITH TAMPER RESISTANT NETWORKABLE SYSTEM

FIELD

The present embodiments generally relate to modular tamper resistant solar powered rechargeable street lights and light networks.

BACKGROUND

A need exists for a solar powered rechargeable street light and system that can be used individually or powered from a central controller for security purposes, such as in a prison area, or in an area known for crime, such as vandalism and theft.

A need exists for a solar powered rechargeable street light and system that can be quickly installed, with no welding, easily transported down a roadway without the need for special permits, and have replaceable components.

A further need exists for a solar powered rechargeable street light and system that has a robust photovoltaic frame which can withstand sandstorms and impact of high velocity particulate without shutting down.

The present embodiments meet these needs.

BRIEF DESCRIPTION OF THE DRAWINGS

The detailed description will be better understood in conjunction with the accompanying drawings as follows.

Figure 1:
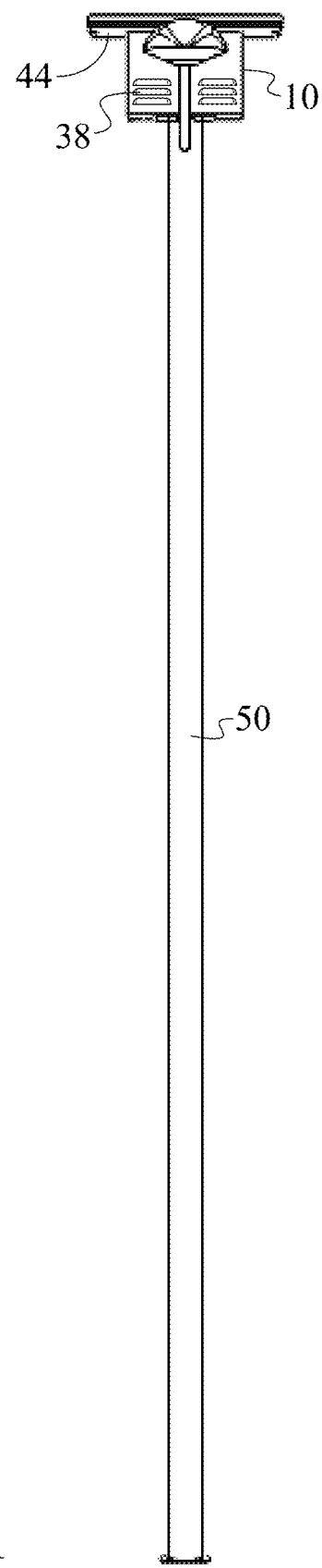
FIG. 1 is a front view of an assembled solar powered rechargeable street light.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a solar powered rechargeable street light, which is modular and tamper resistant that can further be networked to a system.

The solar powered rechargeable street light can have a housing that can be tamper resistant and can be made of metal, such as a powder coated steel.

The housing can have a bottom, a sloping top, a first trapezoidal shaped side, which can be integrally connected at about a 90 degree angle to a second trapezoidal shaped side. A rectangular shaped back opposite a rectangular shaped front can be connected integrally between the sides, also at about a 90 degree angle. In an embodiment, the housing can be a 6-sided closable box.

The housing contains various electrical components, which can be disposed in a chamber in the housing. At least one battery can also be contained in the chamber.

In an embodiment, a projecting flange can extend from the rectangular front side. The rectangular front side can further have a door, which can be hingedly connected. The door can further have a reinforcing flange, which can be from about 0.90 inches to about 0.125 inches in thickness. The reinforcing flange can further have a locking means, which can be a bolt.

A removable restraining bar, which can be made of metal, such as steel, that can be from about 1 foot to about 6 feet in length, about 0.5 inches to about 2 inches wide and can be disposed between the rectangular front side and the first and second trapezoidal shaped sides for holding at least one battery, or multiple batteries in the chamber so that they can not move.

The removable restraining bar can attach to securing flanges in the chamber, or slide into the chamber and hold the batteries in the chamber without bouncing or sliding around.

In an embodiment, a solar controller can be disposed in the chamber. It can be mounted to the removable restraining bar and connected to one or more of the batteries in the chamber. The solar controller can also be mounted to another flange or holder in the chamber.

In an embodiment, a solar array frame, which can be located above the housing, can have four sides and can further be disposed on a solar mounting plate. The solar mounting plate can be affixed to the sloping top. The solar array frame can cover the entire housing, and can further extend beyond the housing a few feet to four feet on every side.

The solar array frame can hold at least one photovoltaic cell. In an embodiment, four solar panels, each with a plurality of photovoltaic cells, which can be connected in parallel, can be installed in the solar array frame.

In another embodiment the at least one solar panel containing a plurality of photovoltaic cells can be mounted directly to the solar mounting plate to reduce shipping costs and to make assembly in the field easy.

In an embodiment, the solar mounting plate can be mounted on the sloping top no more than 10 percent from a parallel plane with a surface to which the solar powered rechargeable street light is mounted, enabling the solar panels to be mounted to the housing so that they are horizontal to the surface supporting the solar powered rechargeable street light, that is, presenting a flat surface area, which can maximize the absorption of sun rays in areas near the equator.

The photovoltaic cell of the solar panel can provide power to at least one solar controller that facilitates charging at least one battery, which actually runs the solar powered rechargeable street light, that is also contained within the housing.

The solar controller can be remotely operated from a web based controller which can be a web based server and the solar powered rechargeable street light can be connected via a network, such as a cellular network to the web based server or a client device or another server. The network can be the Internet.

The solar controller can communicate with a processor in the housing. The processor can have associated data storage with computer instructions in the data storage that can instruct the processor to connect to at least one network and provide an alarm when a sensor connected to the processor indicates that the housing, the solar panel, or the door have been tampered with, such as with destructive force.

The data storage can also include computer instructions that can allow the processor to be monitored via the network and the web based server or client device. A group of similarly designed solar powered rechargeable street lights can be monitored in this manner, using a computer program that can produce an executive dashboard to the web based server allowing a client device to monitor a group of lights and track simultaneously which lights are still safely operating or ones that have been tampered with. Tampering can be an attack from vandals, weather, or war related phenomena. This is particular usable in a dangerous area, such as a war zone.

The projecting flange around the door can extend from about 0.5 inches to about 2 inches and can surround the perimeter of the door. An elastomeric seal, a rubber or a similar plastic, slightly compressible flexible gasket can be disposed on the projecting flange to ensure a water resistant connection.

In addition to the door flanges, the solar array frame can further contain at least 1 to 2 lifting holes, which can surround the perimeter of the frame for ease of lifting the solar powered rechargeable street light.

The housing has a design that is rugged, water resistant and sealed for sturdy impact resistant outdoor use. The housing can be made from about 0.90 inches to about 0.125 inches thick and can further be powder coated steel.

In the interior space of the housing, which is formed by the housing sides, and which can also be referred to herein as "the chamber" can contain at least one battery and up 12 batteries. The batteries can be lead-based chargeable car or marine batteries, or other similar rechargeable DC batteries.

The batteries can be contained in the chamber using insulation, such as Styrofoam™ or other closed cell foam insulation, to reduce the build up of ionic charge and prevent shocking when a user touches the door to open the chamber for repairs.

The insulation and the batteries can both be held in the housing with a removable bar that clicks into brackets, enabling the batteries and insulation to be held securely during transit without bumping or crashing about in the housing.

A solar controller in the housing can be adapted to receive a charge from the at least one solar panel having at least one photovoltaic cell through an electrical conduit that runs from the solar array frame or runs simply from the solar mounting plate through a hole or similar port into the top side of the housing.

The power from the solar array, which can be 9 volts, 12 volts and up to 27 volts, or any voltage in between, can be used to charge the batteries either in series, in parallel or in parallel and in series.

A battery balancing circuit can be placed between the batteries to ensure that the batteries are balances for charge when the batteries are in a quiescent mode, a charging mode, or experience a load.

The battery balancing circuit is a unique feature that provides a long lasting power supply in a remote environment, by ensuring that all batteries are usable instantly, that is, all batteries will be able to support a load, which is very important for military uses.

In an embodiment, connected to the batteries and nested in one or more sides of a hollow pole to which the housing can be secured can be at least one power interface.

At least one power interface can be disposed at the base of each light and can provide a current for a user to engage, such as a "cigarette lighter" allowing a user to charge a cell phone, or run an emergency cell phone. The power interface can be a 6 volt interface, 12 volt, 24 volt or some other DC voltage between about 6 volts to about 27 volts allowing the plug in of a charging cable from a user electronic device, like a cell phone into the power interface. The power interface can be used in an area prone to major energy outages, such as remote jungle areas and used to charge cellular phones, iPods™, or emergency medical equipment.

Additional power interfaces can be AC power interfaces provided an inverter is installed in the housing. The current with the inverter could be between about 110 volts to about 230 volts for use with portable analysis tools, such as, portable seismic equipment, portable radio equipment or other equipment that would need recharging in the field, or need to be plugged into a 110 power supply or 220 power supply in order to work, such as an additional directed lighting and lights usable for landing helicopters or airplanes in a remote location.

The power interfaces of the solar powered rechargeable street lights be used to assist in running field hospital equipment in the event of a natural disaster, such as flooding in an area, or a hurricane affected zone.

Multiple power interfaces can be provided on at least one of the hollow pole sides for access by a user with multiple devices, with all power interfaces would be integral in the hollow pole, providing wiring running inside the hollow pole, to prevent tampering or deterioration due to weather.

In an embodiment, all power interfaces can be identical. In another embodiment the power interfaces can be mixed and have different voltages on the same solar powered rechargeable street light.

The rechargeable user device for engaging at least one power interface can be an air compressor for inflating flat tires, a weather station for detecting tornadoes with Doppler™ radar and other detection devices, such as the advance of the enemy in a war-torn area.

The solar controller with associated processor can be used to monitor and control charging of at least one of the plurality of batteries from the solar panel with at least one photovoltaic cell. A usable solar controller can be one made by Solarcraft, Inc. of Houston, Tex.

An embodiment contemplates that the door of the housing would be a locking door having a "locking means." For this application, the term "locking means" can refer to a controlled access door, such as one using an electronic biometric lock connected to at least one of the batteries in the chamber, which can read fingerprints.

The door of the housing can be opened or closed with a locking rotatable fastener, a locking knob, or another type of fastener.

The hollow pole for supporting the housing can be made of the same material as the housing. The hollow pole can be from about 6 feet to about 35 feet tall. The pole can be made from about 1 to about 6 modularly connected components, such as in a telescoping screwable threaded construction with locking fasteners which allows for small storage during shipment of the light fixtures and variability in the desired height of the light.

The hollow pole is to be strong to support the solar array non-deformably above the solar powered rechargeable street light frame during winds what can gust up to about 85 mph. The hollow pole and solar powered rechargeable street light can be configured to withstand hurricane 2 force winds without coming apart or deforming.

The hollow pole, if of the telescoping construction, can further contain interior slidably attaching channel bars, which can be made from solid metal or another solid metal plate that extends from a first of the modular components of the hollow pole to a second of the modular components of the hollow pole on an interior portion of the hollow pole to reinforce the pole for hurricane strength winds and strong ice build up.

A system charge gauge can be mounted in the chamber of the housing and connected to the solar controller with processor and information on the charge gauge, which can be communicated to the network, such as the Internet to communicate to a remote monitoring site of the status of charge on one or all of the batteries in the chamber.

If the batteries start to fail, a technician can be alerted before failure to replace the failing battery or do an inspection of the street light to determine the cause of a decrease in current using the system charge gauge monitoring device.

In an embodiment, it can be contemplated that the solar powered rechargeable street light can run, provide a charge to a user at street level, and be monitored remotely through the Internet simultaneously.

An embodiment of the solar powered rechargeable street light is that the hollow pole, related housing, the pole mounting plate, a pole body secured to the pole mounting plate, and a pole footing secured to the body can all be shipped in a standard shipping container used with container vessels, which are generally about 8 feet by about 20 feet. The solar panels can be securely stacked in units, lowering the cost of transport by sea from a place like Houston to a place like Nigeria.

In another embodiment, a protective cover can be used over all of the power interfaces to protect them during shipment or when not in use in the harsh regions, such as the desert, or in the rain forest, to help prevent from rapid deterioration.

In an embodiment, the protective cover can be tamper proof and can be locked and hingedly connected to any hollow pole with a power interface. In another embodiment, the protective cover can be removably disposed over the at least one or a plurality of power interfaces. In another embodiment, the protective cover can further be rectangular and can be made of a polymer, such as polypropylene.

A plurality of anchor bolts can be disposed in a pole footer for supporting the pole without tipping over.

A pole hole in the hollow pole below the pole mounting plate can be used, allowing a hollow arm to connect to the pole hole. A light fixture or light head can be connected to the hollow arm when wiring from the light fixture passes through the hollow arm and the pole hole to the hollow pole for connecting to the solar controller of the housing.

The hollow arm can be removably secured to the hollow pole for ease of shipment and ease of maintenance in the field.

More than one pole hole can be formed in the hollow pole allowing more than one hollow arm each with a light fixture to be supported by the hollow pole and be run by the solar array charging batteries.

One or more lights can be used in connection as a networked lighting group to provide a lighted connected zone for security around a construction site, or security in a prison.

Turning now to the Figures, FIG. 1 shows a front view of an assembled solar powered rechargeable street light.

In this Figure, the housing 10 is shown on the hollow pole 50. The housing 10 is mounted to the solar mounting plate 44. A vent 38 is also shown mounted in the housing.

Figure 2:
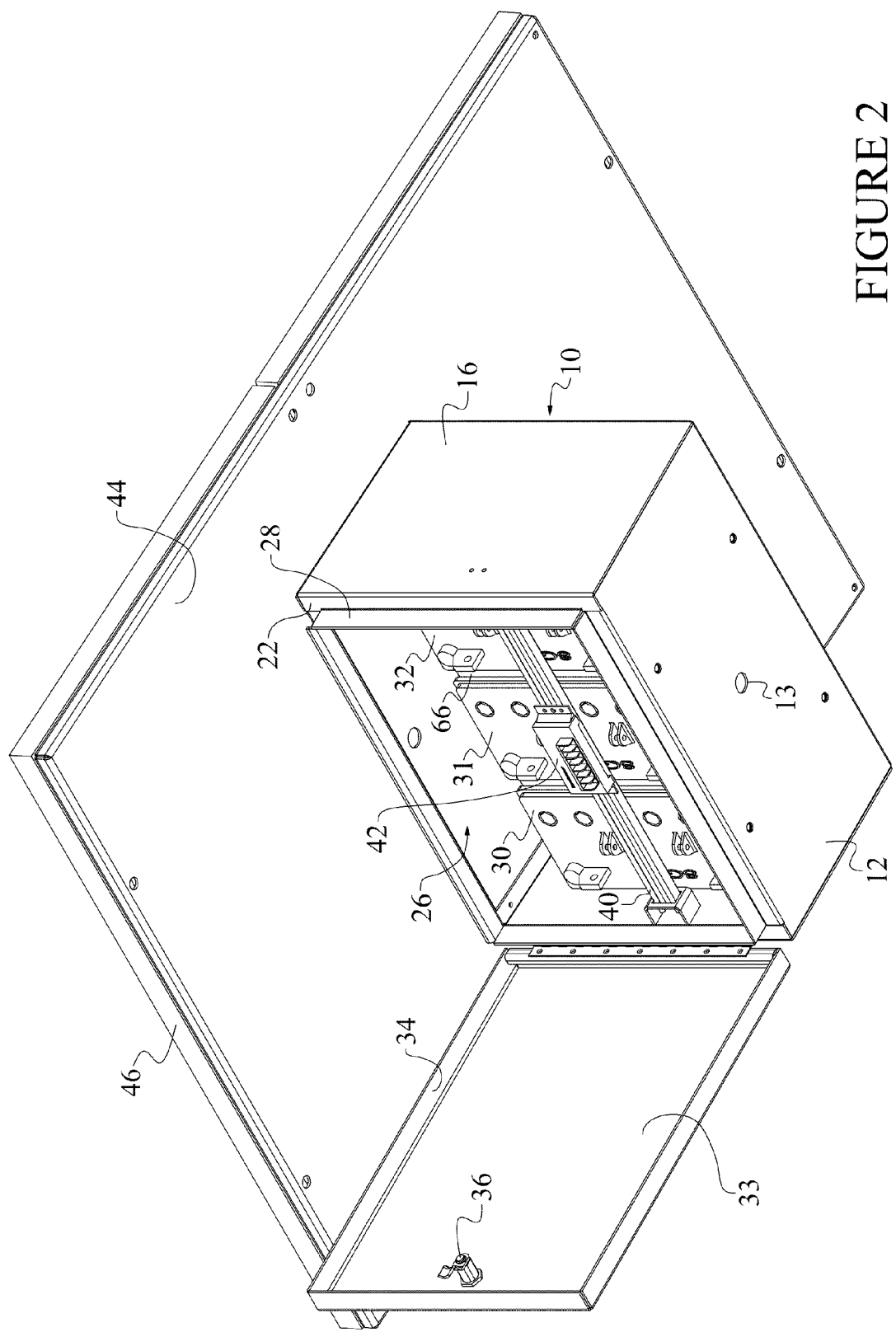
FIG. 2 is a bottom view of the housing attached to the solar mounting plate.

FIG. 2 is a bottom view of the housing 10 attached to the solar mounting plate 44, which in this embodiment has a solar panel 46.

The housing 10 is shown with a bottom 12, a bottom hole 13, a first trapezoidal shaped side 16 and a rectangular shaped front side 22.

In the rectangular shaped front side 22 is a front opening surrounded by a projecting flange 28.

The sides, top and bottom of the housing 10 form a chamber 26, in which is contained at least one battery, shown in this Figure is a first battery 30, a second battery 31, and a third battery 32.

A door 33 is shown hingedly attached to the rectangular shaped front side 22. The door is also shown with a locking means 36.

A solar controller 42 is mounted in the chamber 26 and is also shown mounted to a removable restraining bar 40 that is used to secure the three batteries 30, 31, 32 in the chamber 26 so they will not move easily. Insulation 66 is shown disposed between the batteries 30, 31, 32.

Figure 3:
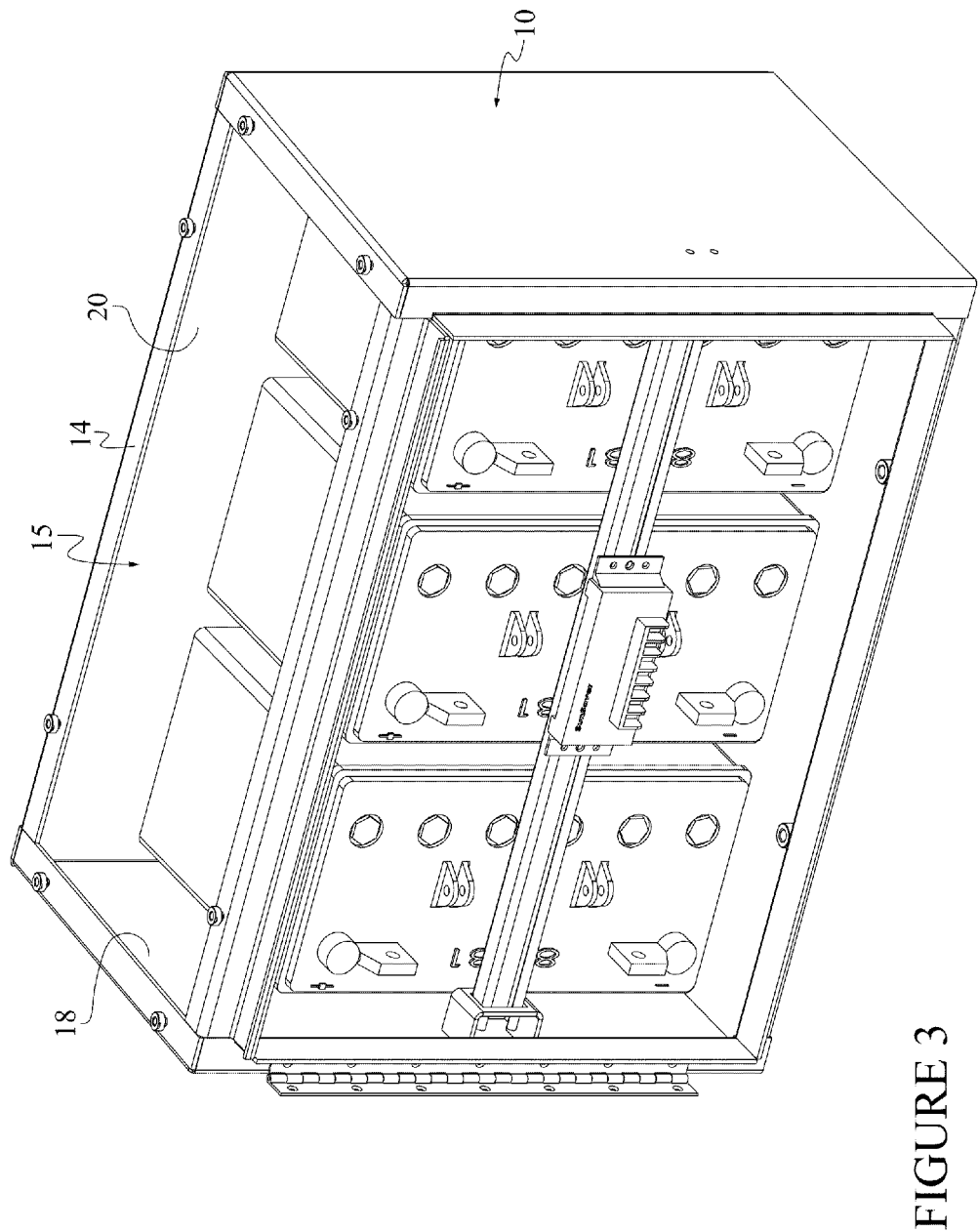
FIG. 3 is a top view of the housing with three batteries.

FIG. 3 shows a top view of the housing 10 without being mounted to the solar mounting plate. It can be seen in this Figure that the housing 10 can have a sloping top 14 with a top opening 15. Also the rectangular shaped back 20, which can be solid, and the second trapezoidal shaped side 18 are also shown.

The door's reinforcing flange 34 can be viewed in this embodiment that provides a reinforced door rather than just a connecting hinge mounting, which can allow up to about 600 pounds of applied pressure to refuse to deform the door. This reinforcing flange is a feature of the tamper resistant housing, preventing access by vandals, or other forces of nature, such as hurricane strength winds.

Figure 4:
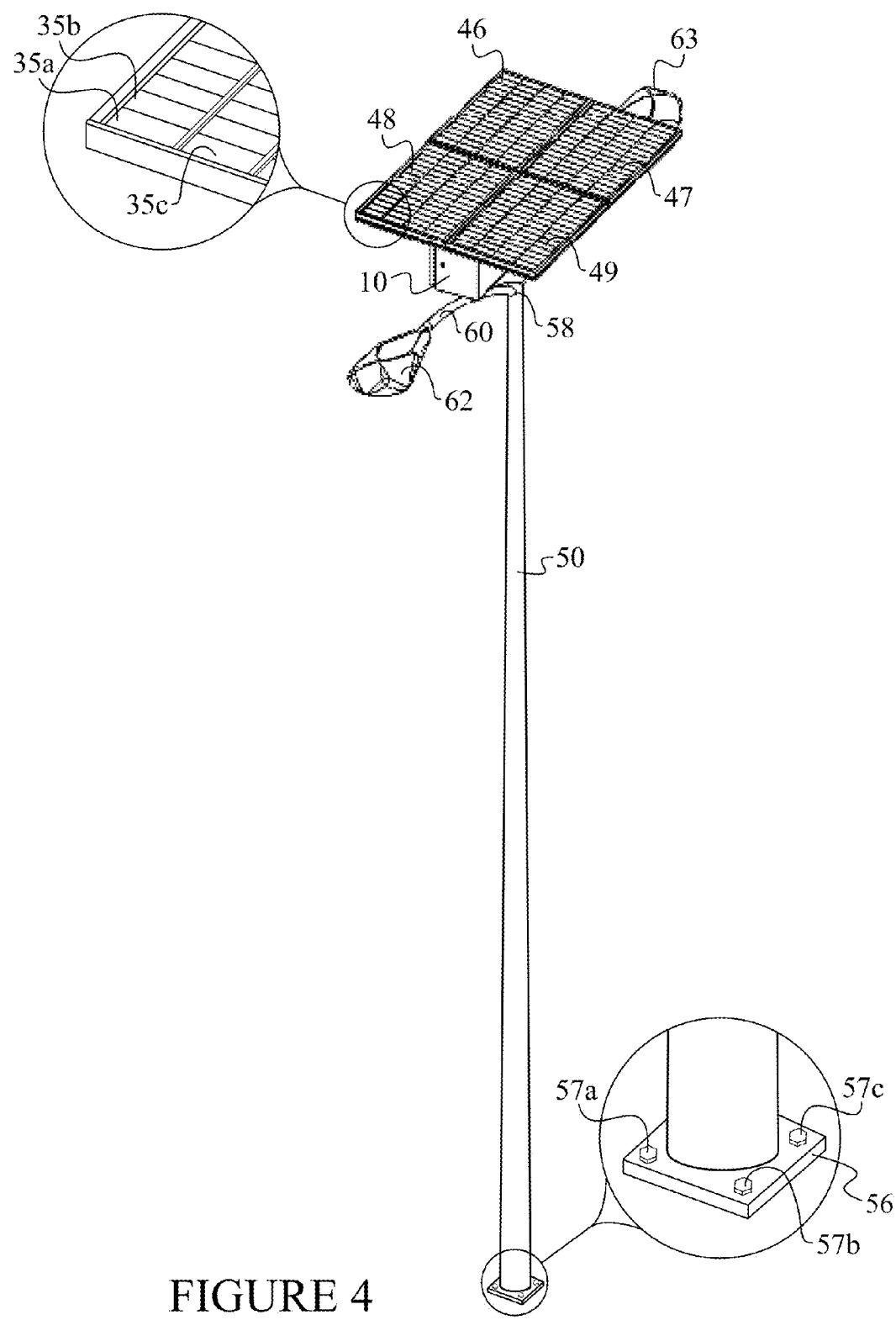
FIG. 4 is a top view of the solar powered rechargeable street light with two light fixtures.

FIG. 4 shows a top view of the solar powered rechargeable street light with four solar panels 46, 47, 48, 49, wherein each solar panel is shown having a plurality of photovoltaic cells 35a, 35b, 35c.

The solar panels 46, 47, 48, 49 can each be mounted to a solar panel mounting plate. The solar panels are for charging batteries in the housing 10 which operates a first light fixture 62 and a second light fixture 63. The first light fixture 62 can secure to a first hollow arm 60, and the second light fixture 63 can secure to a second hollow arm, not shown in this Figure. The first hollow arm 60 can attach at a pole hole 58 to the hollow pole 50.

The hollow pole 50 supporting the solar panels, light fixtures 62, 63 and housing 10 can have on the end opposite the solar panels 46, 47, 48, 49, a pole footer 56, which can engage a footing that is not shown. In the pole footer 56, three of the four anchor bolts 57a, 57b, 57c for securing the solar powered rechargeable street light to a surface, such as a concrete footing.

Figure 5:
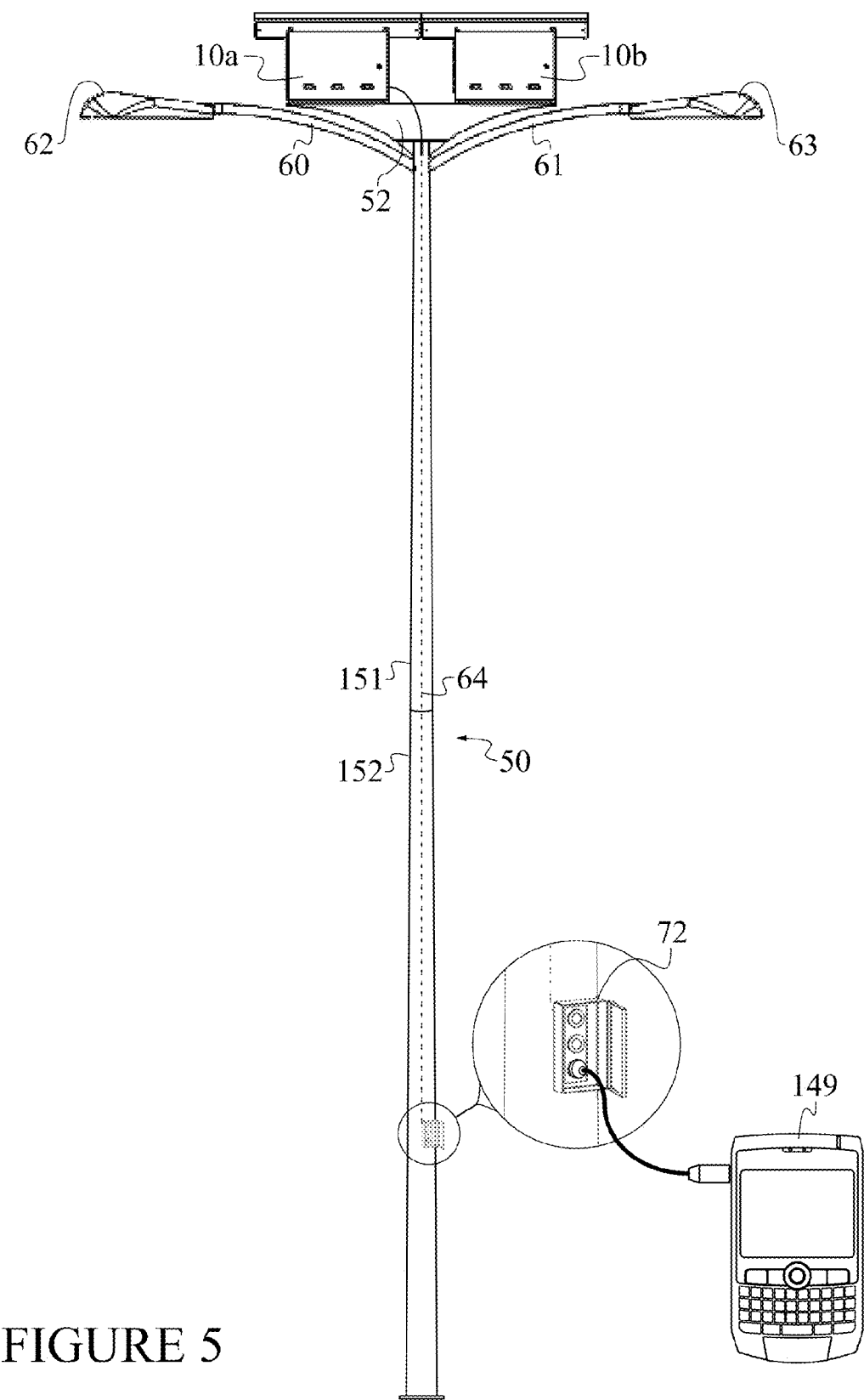
FIG. 5 is shows the solar powered rechargeable street light to provide a power interface to users at street level.

FIG. 5 shows an embodiment with two housings 10a, 10b. Wiring 64 can be seen running from the first light fixture 62 to the first housing 10a as well as running down to a power interface 72 for engagement with a rechargeable user device 149.

First hollow arm 60 and second hollow arm 61 can be viewed in this embodiment. A pole mounting plate 52 can also be viewed for supporting both housings 10a, 10b to the hollow pole 50. The hollow pole is shown having two sections, a first section 151, and a second section 152 in this Figure, which can telescope together for use with small shipping containers, such as standard 8 feet by about 20 feet shipping containers, which can be used on container ships for a lower cost of shipping.

Figure 6:
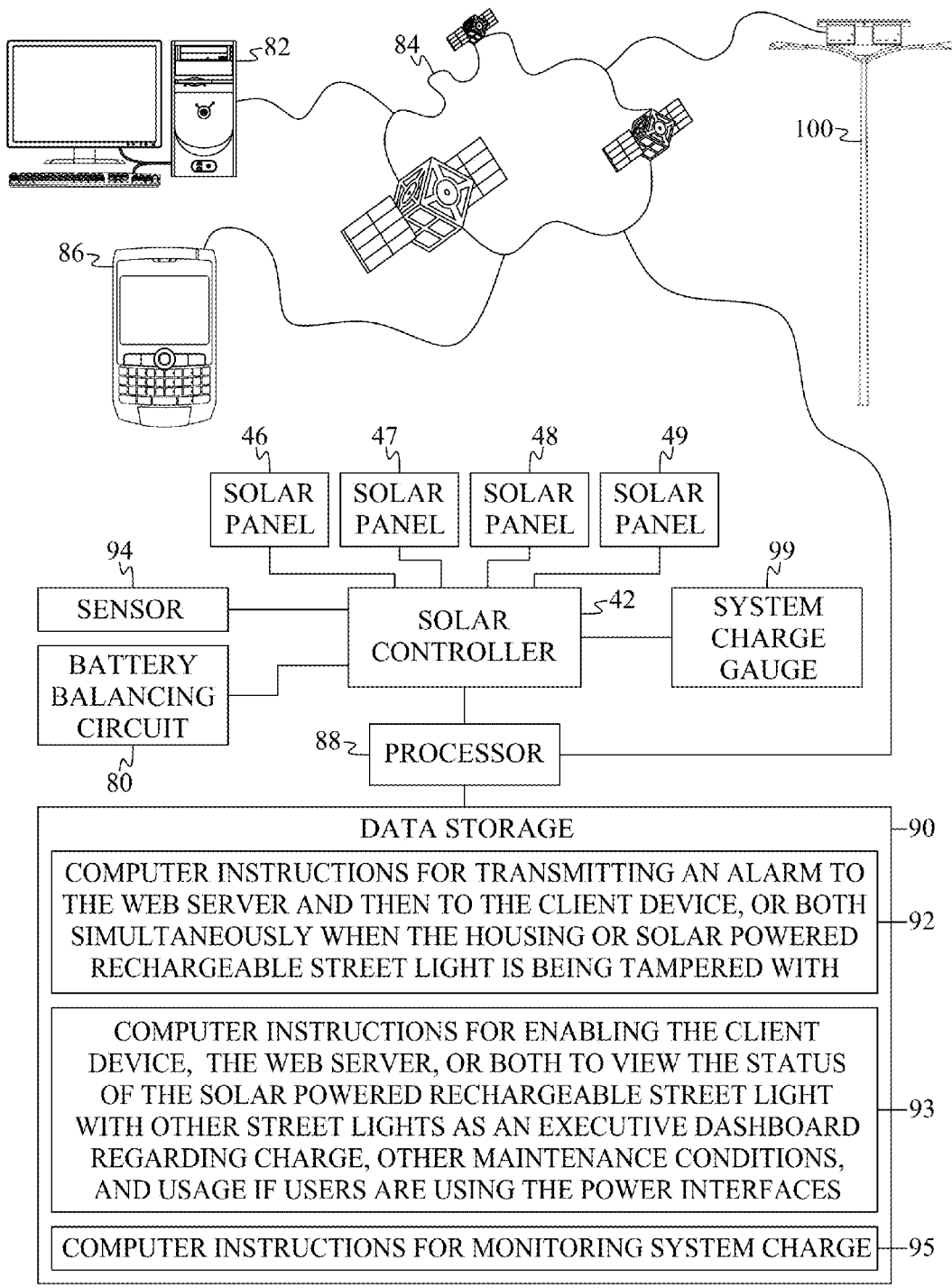
FIG. 6 is a diagram of electronics usable with an embodiment of the networked system.

FIG. 6 is a diagram of the electronics usable with an embodiment of networked system.

In this Figure, the solar controller 42 can communicate with a sensor 94 for tamper detection, which can also communicate with a battery balancing circuit 80 for managing, monitoring and maintaining charge of the batteries regardless of mode.

The solar controller 42 can also connect to each of the solar panels 46, 47, 48, 49. The solar controller 42 can also connect to a processor 88 that can communicate with at least one network 84. On the network can be a web based controller or a web server 82 that communicates with at least one client device 86 and another street light 100.

The processor 88 also communicates with data storage 90. The processor 88 and data storage 90 can both be disposed within the housing.

The data storage 90 can have computer instructions 92 for transmitting an alarm to the web server and then to the client device, or both simultaneously when the housing or solar powered rechargeable street light is being tampered with.

The data storage 90 is shown also having computer instructions 93 for enabling the client device, the web server, or both to view the status of the solar powered rechargeable street light with other street lights as an executive dashboard regarding charge, other maintenance conditions, and usage if users are using the power interfaces.

This Figure also depicts that a system charge gauge 99 can be used with the solar controller 42 and processor 88, and the data storage 90 can also have computer instructions 95 for monitoring system charge 95.

Figure 7:
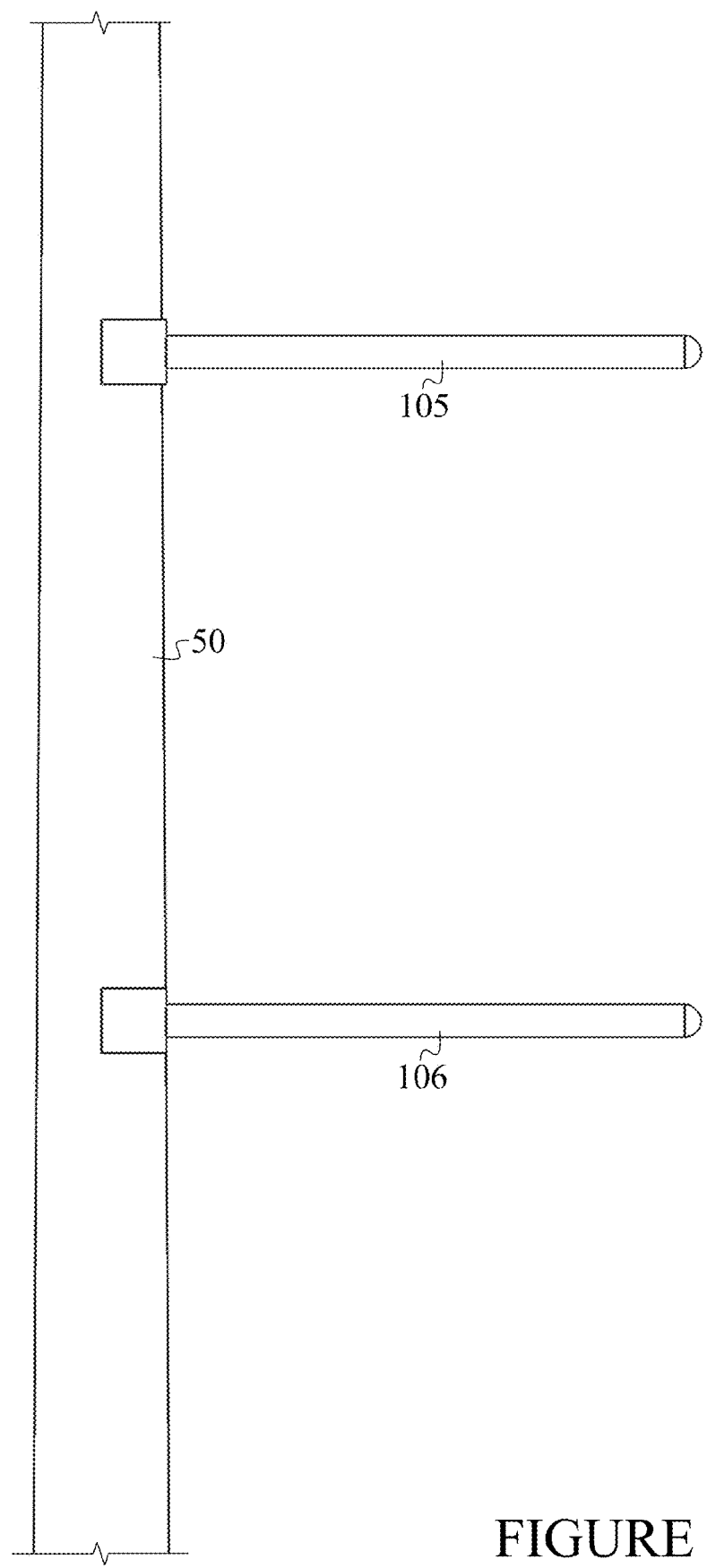
FIG. 7 is a detailed view of a banner mounting for the hollow pole usable in an embodiment of the street light.

FIG. 7 shows an embodiment of the invention wherein a first banner holder 105 is mounted on the hollow pole 50 in a spaced apart relationship to a second banner holder 106. The first and second banner holder can be used for providing emergency instructional banners, banners with color or directions, or other text while affixed to the street light.

Figure 8:
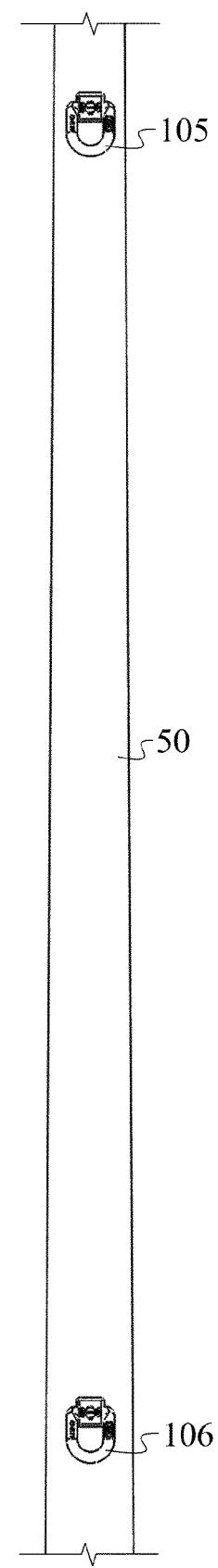
FIG. 8 is another embodiment of a banner mounting for the hollow pole of the street light.

FIG. 8 shows another embodiment banner holders, wherein a first banner holder 105 is mounted on the hollow pole 50 in a spaced apart relationship to a second banner holder 106.

Figure 9:
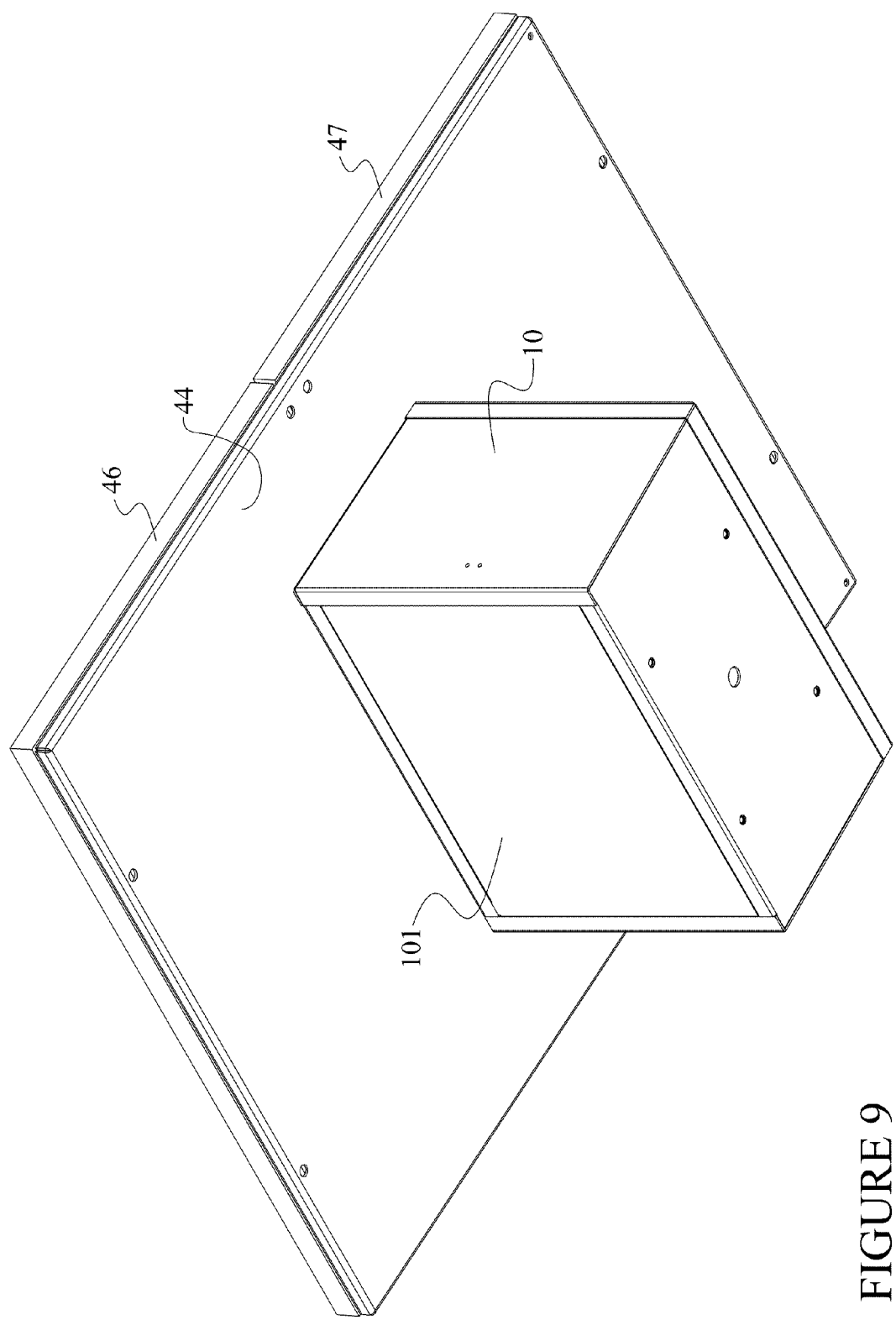
FIG. 9 is a detailed view of the message area usable on the housing of the street light.

FIG. 9 shows an embodiment of the invention wherein the housing 10 with solar mounting plate 44 with at least two solar panels 46, 47 can further include a message area 101. The message area can contain a message area for text, symbols and logos, instructions, which can provide a viewer with directions, a surface for an advertising message, or additional media. The message area 101 can further be predominately a color, such as red, or a combination of colors.

While these embodiments have been described with emphasis on the embodiments, it should be understood that within the scope of the appended claims, the embodiments might be practiced other than as specifically described herein.

What is claimed is:

1. A solar powered rechargeable street light comprising:
   a. a housing comprising:
      i. a bottom with a bottom hole, a sloping top, a first trapezoidal shaped side, a second trapezoidal shaped side, a rectangular shaped back, and a rectangular shaped front, wherein each side, front and back is connected between the bottom and the sloping top, wherein the rectangular shaped front has a front opening and wherein the housing forms a chamber; and
      ii. a projecting flange extending from the rectangular shaped front;
      iii. at least one battery in the chamber;
      iv. a door hingedly connected to the rectangular shaped front, wherein the door has a reinforcing flange and a locking means;
      v. a removable restraining bar disposed between the rectangular shaped front, the first trapezoidal shaped side and second trapezoidal shaped side for holding the at least one battery securely to the rectangular shaped back; and
      vi. a solar controller secured to the removable restraining bar and connected to the at least one battery;
   b. a solar mounting plate secured to the sloping top;
   c. at least one solar panel comprising at least one photovoltaic cell secured to the solar mounting plate and connected to the solar controller;
   d. a pole mounting plate for connecting to the housing having a port for connecting to the housing;
   e. a hollow pole connected over the port of the pole mounting plate, wherein the hollow pole comprises:
      i. a pole body secured to the pole mounting plate;
      ii. a pole footer secured to the pole body for engaging at least four anchor bolts disposed in a footing for supporting the hollow pole without tipping over;
      iii. at least one pole hole in the pole body below the pole mounting plate; and
      iv. at least one hollow arm removably connected to the hollow pole engaging with the pole hole;
   f. at least one light fixture secured to at least one hollow arm, wherein wiring from the at last one light fixture passes through at least one hollow arm and through at least one pole hole and into the pole body for connecting to the solar controller of the housing.

2. The solar powered rechargeable street light of claim 1, further comprising insulation disposed in the chamber between the at least one battery and the sides of the housing.

3. The solar powered rechargeable street light of claim 1, wherein at least one of the hollow arms is welded to the hollow pole.

4. The solar powered rechargeable street light of claim 1, wherein the sloping top has a top opening.

5. The solar powered rechargeable street light of claim 1, further comprising at least one power interface in the hollow pole connected to the solar controller for powering at least one client device.

6. The solar powered rechargeable street light of claim 1, further comprising a charge gauge for monitoring charge of the at least one battery and the processor connected to a data storage for communicating charge gauge information with a network.

7. The solar powered rechargeable street light of claim 6, further comprising a web based controller connected to the network for communicating with at least one client device on the status of each of the street lights.

8. The solar powered rechargeable street light of claim 7, further comprising a sensor secured to the housing for indicating if the street light is under attack, and wherein the sensor communicates with the processor.

9. The solar powered rechargeable street light of claim 8, further comprising computer instructions in the data storage for providing an alarm to the web server when the sensor indicates that the housing or another portion of the street light is under attack.

10. The solar powered rechargeable street light of claim 9, further comprising computer instructions in the data storage enabling a client device to review an executive dashboard to monitor multiple street light status.

11. The solar powered rechargeable street light of claim 1, further comprising a battery balancing circuit allowing at least two batteries in the chamber to maintain a charge for a long time regardless of being in a charging mode, a load supplying mode, or a quiescent mode.

12. The solar powered rechargeable street light of claim 1, further comprising a power interface disposed in the hollow pole and connected to the solar controller for supplying power to a client device proximate to the base of the hollow pole.

13. The solar powered rechargeable street light of claim 1, wherein the hollow pole comprises a plurality of interlocking telescoping modular sections allowing the hollow pole to have a plurality of nested modular sections or a single hollow pole when the sections are telescoped out.

14. The solar powered rechargeable street light of claim 1, wherein the housing further comprises a message area for presenting text or symbols to a viewer.

15. The solar powered rechargeable street light of claim 14, wherein the message area is predominately a color or a combination of colors.

16. The solar powered rechargeable street light of claim 1, further comprising a first banner holder is mounted on the hollow pole in a spaced apart relationship to a second banner holder for providing emergency instructional banners or banners with color or directions or other text while affixed to the street light.

* * * * *